(12) United States Patent
Huter et al.

(10) Patent No.: US 6,802,184 B2
(45) Date of Patent: Oct. 12, 2004

(54) TURBOCHARGER DEVICE FOR AN INTERNAL COMBUSTION ENGINE

(75) Inventors: Jürgen Huter, Weissach (DE); Siegfried Weber, Stuttgart (DE); Patric Hoecker, Landau (DE); Frank Pflüger, Hochstetten (DE)

(73) Assignees: DaimlerChrysler AG (DE); Borgwarner Inc., Auburn Hills, MI (US)

( * ) Notice: Subject to any disclaimer, the term of this patent is extended or adjusted under 35 U.S.C. 154(b) by 0 days.

(21) Appl. No.: 10/257,644

(22) PCT Filed: Apr. 11, 2001

(86) PCT No.: PCT/EP01/04165

§ 371 (c)(1), (2), (4) Date: Apr. 16, 2003

(87) PCT Pub. No.: WO01/81744

PCT Pub. Date: Nov. 1, 2001

(65) Prior Publication Data

US 2003/0159442 A1 Aug. 28, 2003

(30) Foreign Application Priority Data

Apr. 20, 2000 (DE) .......................................... 100 19 774

(51) Int. Cl.[7] .......................... F02B 33/44; F02B 37/07; F02B 37/13; F01D 25/24; F02C 6/12

(52) U.S. Cl. ............................. 60/612; 60/602; 123/562

(58) Field of Search ..................... 60/602, 612; 123/562

(56) References Cited

U.S. PATENT DOCUMENTS

| | | | | |
|---|---|---|---|---|
| 4,032,262 A | * | 6/1977 | Zehnder ....................... | 60/612 |
| 4,930,315 A | * | 6/1990 | Kanesaka ..................... | 60/612 |
| 5,140,817 A | * | 8/1992 | Matsuda et al. .............. | 60/612 |
| 5,199,261 A | * | 4/1993 | Baker ........................... | 60/612 |
| 5,408,979 A | * | 4/1995 | Backlund et al. ............. | 60/612 |
| 6,311,493 B1 | * | 11/2001 | Kurihara et al. .............. | 60/612 |
| 6,378,308 B1 | * | 4/2002 | Pflüger ......................... | 60/612 |

* cited by examiner

*Primary Examiner*—Sheldon J Richter
(74) *Attorney, Agent, or Firm*—Pendorf & Cutliff; Greg Dziegielewski

(57) ABSTRACT

A turbocharger device for an internal combustion engine including two exhaust gas turbochargers, wherein a regulating device for adjustment of the supply of exhaust gas to one of the turbines or to both turbines is provided in the flow stream of the exhaust gas. A common exhaust gas inflow channel for both turbines is preferably provided on the turbine housing of one of the exhaust gas turbochargers, with two exhaust channel segments for supplying exhaust gas to the respective turbines branching off from the exhaust gas inflow channel. The regulating device is provided where the exhaust gas channel segments branch from the exhaust gas inflow channel on the turbine housing.

12 Claims, 6 Drawing Sheets

TURBOCHARGER DEVICE FOR AN INTERNAL COMBUSTION ENGINE

BACKGROUND OF THE INVENTION

1. Field of the Invention

The invention concerns a turbocharger device for an internal combustion engine according to the pre-characterizing portion of claim 1.

2. Description of the Related Art

From DE 31 42 499 A1 a turbocharger device is known with two exhaust turbochargers of different size arranged sequentially, wherein one of the turbochargers can be engaged or disengaged via controllable valves. The control of the valves occurs electronically depending upon the respective operating condition of the internal combustion engine, whereby an optimal efficiency can be achieved.

A comparable turbocharger device is known from WO 91/18192, which likewise shows two sequentially arranged exhaust gas turbochargers, however in this case the turbines of both turbochargers can be bypassed by a waste gate with a closeable valve.

This type of turbocharger device conventionally requires a comparatively large installation space, which is often not available, particularly in small vehicles.

SUMMARY OF THE INVENTION

The invention is thus concerned with the task of providing a turbocharger device with compact construction.

This problem is inventively solved by a turbocharger device with the characteristics of patent claim 1.

In accordance with the inventive improvement, a common exhaust gas inflow channel is provided on the turbocharger housing, via which the exhaust gas of the internal combustion engine can be supplied to both turbines in the turbine housing. From the exhaust gas inflow channel, two channel segments branch out, via which the exhaust gas is supplied to each of the turbines respectively. Further, a regulator means is provided, which is situated in the branch point of the exhaust gas channel section of the exhaust gas supply channel. Using the controllable regulating means, the exhaust gas inflow to at least one of the turbines can be adjusted. The exhaust gas inflow channel, which integrates both channel segments branching out from the exhaust gas inflow channel, as well as the regulating device are integrated in the turbine housing, whereby on the one hand a particularly space-saving arrangement can be realized, and on the other hand, the device achieves a modular character, whereby it is possible to construct the inflow channel, the channel sections, and the regulator means as a single exchangeable unit.

The turbine housing, in which the inflow channel of the two channel segments and the regulating means is provided, can either be a part of only one exhaust gas turbocharger or however could be a part of a common housing for both exhaust gas turbochargers.

According to a preferred further developed embodiment it is envisioned that the turbine housing includes a mounting flange, via which the turbocharger device can be rigidly secured to the exhaust gas outlet of the internal combustion engine. The exhaust gas inflow channel in this embodiment is located in the area of the mounting flange. This embodiment offers the advantage that the entire turbocharger device can be secured to the internal combustion engine via the mounting flange, whereby the complexity of the mounting and dismounting of the device is reduced.

In a preferred further development, the two exhaust gas turbochargers of the device are of different size and designed for different volumetric throughputs, wherein the regulating means in the branch of the two channel segments, each segment respectively associated with one of the turbines, can be switched in such a manner that at small loads or, as the case may be, low engine speeds (RPM), the channel segment associated with the larger exhaust gas turbocharger is blocked, in comparison to which at high loads or, as the case may be, high RPM, this channel segment is opened. The two turbochargers are in this manner optimally matched to each other, in that at lower RPM the smaller turbocharger with lower inertia and lag and better responsiveness is driven, and at higher RPM in comparison the larger turbocharger preferably comes into employment, and provides a higher load capacity. Both chargers taken together, and matched to each other in this manner, make it possible to provide a high air throughput and an approximately constant torque.

Finally, it can be useful to integrate into an exchangeable module the two air supply channels, which are provided on the one hand between the compressor output of a first compressor and the compressor input of a second compressor, and on the other hand, on the compressor output of the second compressor. This module is advantageously constructed to be independent of the turbine housing, but, however, at the same time forms a part of the turbocharger device. The exchangeability of the module has the advantage, that the versatility of the device is increased in particular with respect to the adaptation or fitting to various size relationships. Further, the adaptability can be increased in the manner that the compressor output of the first compressor and the compressor input of the second compressor lie on parallel planes; hereby, a further simplification of the assembly and disassembly of the module on the turbocharger device is made possible.

It can be advantageous to provide a connecting channel between the two air supply channels, in which a bypass valve (butterfly valve) is provided. Using the connecting channel and the bypass valve a part of the fresh air flow can be directed to bypass the second compressor, whereby a further degree of freedom for the adjustability of the turbocharger device results, which is advantageous in particular for small volume (displacement) motors, for example for passenger carrying automobiles. The modular design of the air supply channels assembled into a single construction unit or component makes it possible to provide the module with and without connecting channel, or as the case may be, to provide suitable modules which can be exchanged with each other, or however to equip a module without connecting channel with such, or as the case may be, to remove the connecting channel from a module of this type. Modules without connecting channels are particularly employable in utility vehicles.

BRIEF DESCRIPTION OF THE DRAWINGS

Further developments and advantageous embodiments can be seen in the further claims, the description of the figures, and the figures themselves. There is shown:

DETAILED DESCRIPTION OF THE INVENTION

Figure 1:
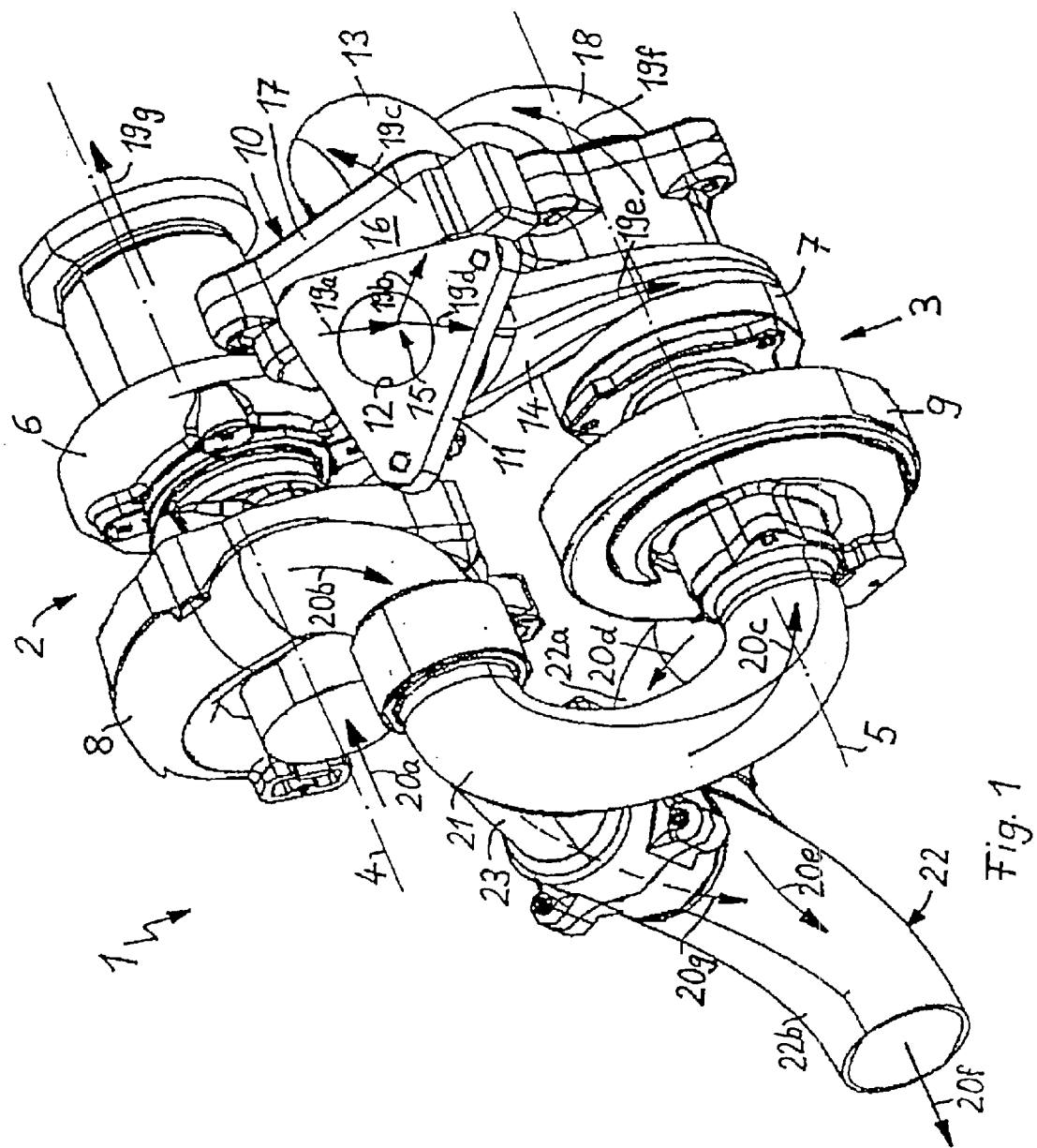
FIG. 1 a perspective view of an inventive turbocharger device.
Figure 2:
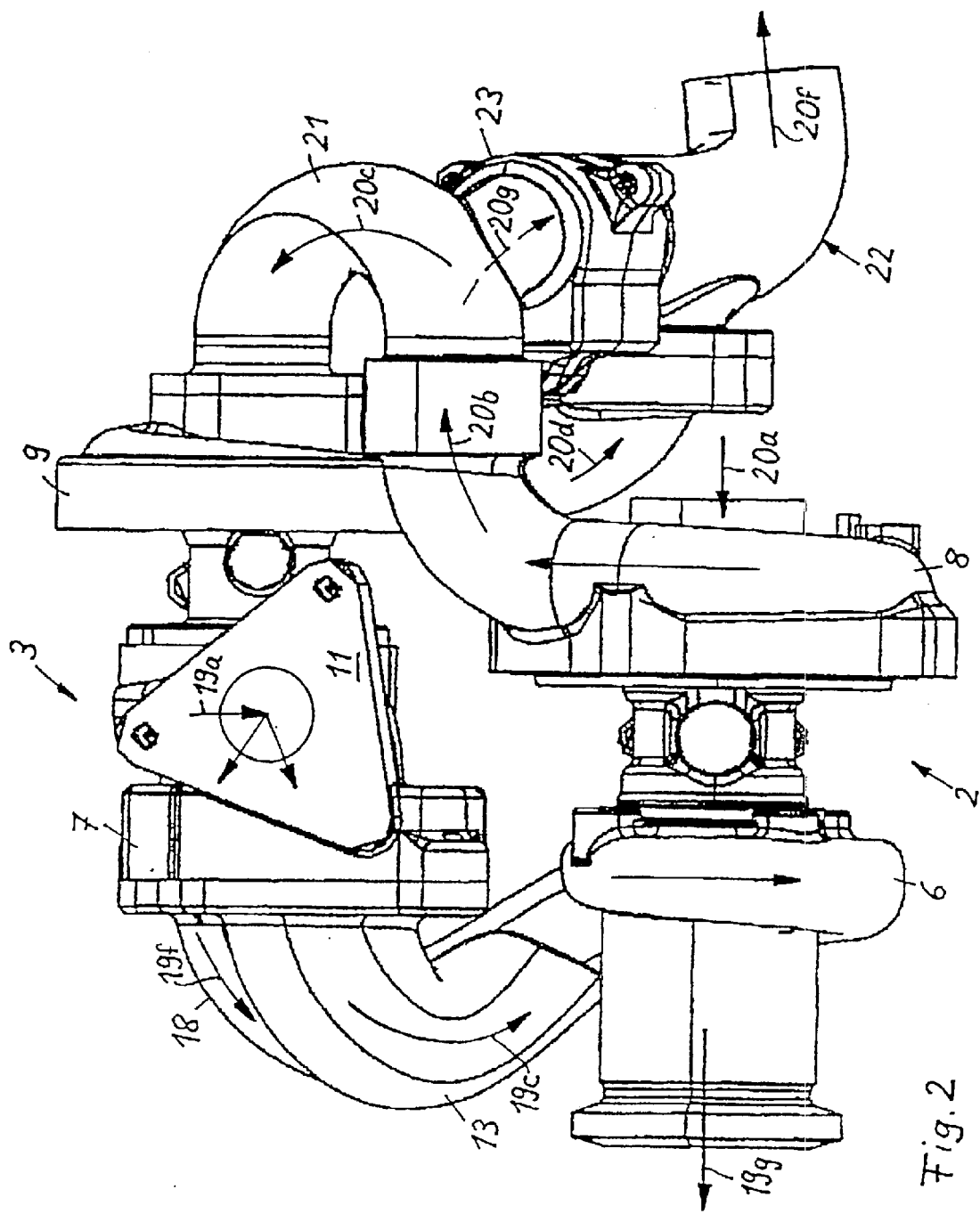
FIG. 2 a top view of the device.
Figure 3:
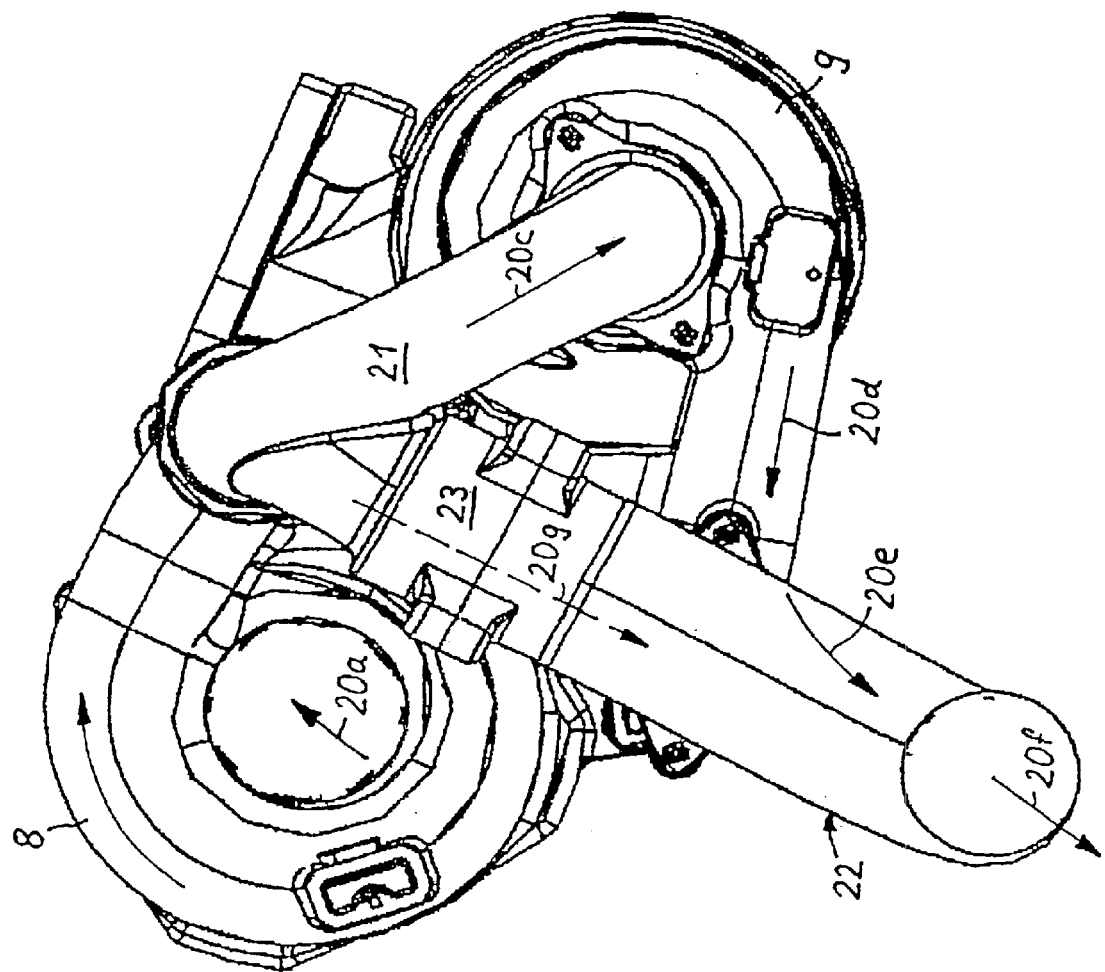
FIG. 3 a front view of the device.
Figure 4:
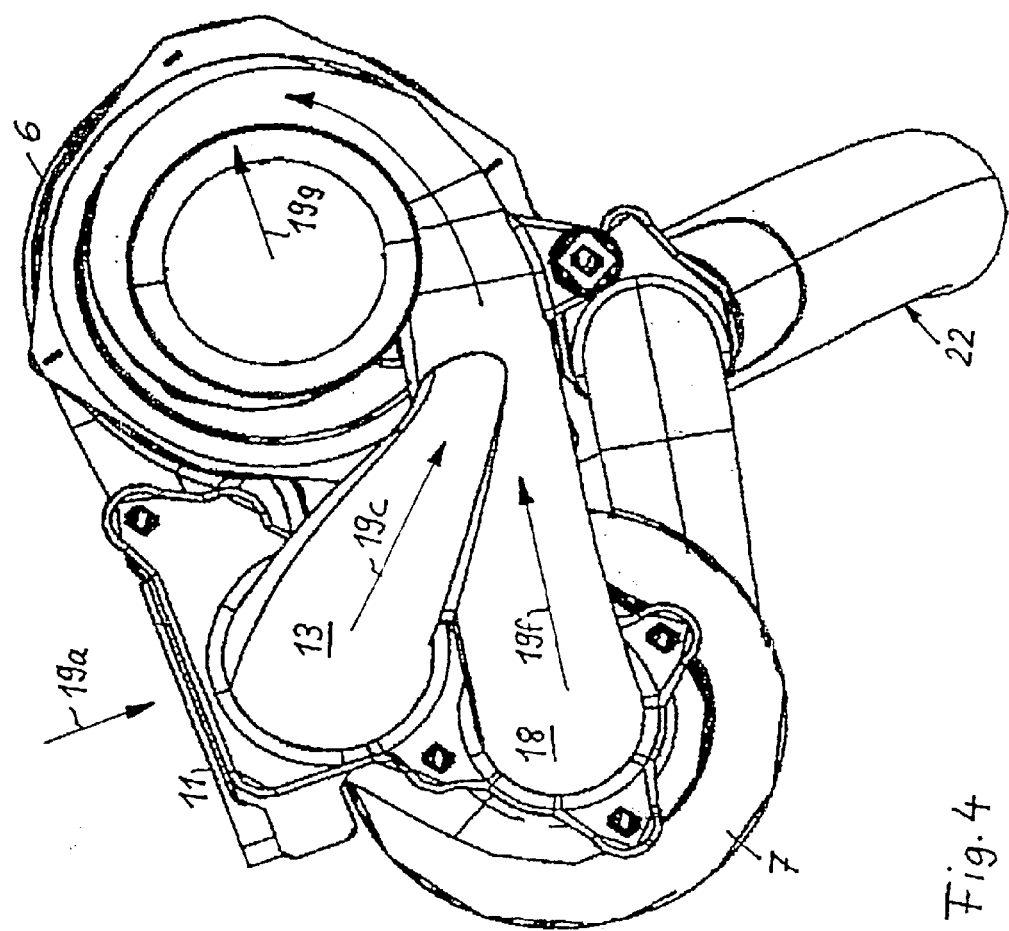
FIG. 4 a back view.
Figure 5:
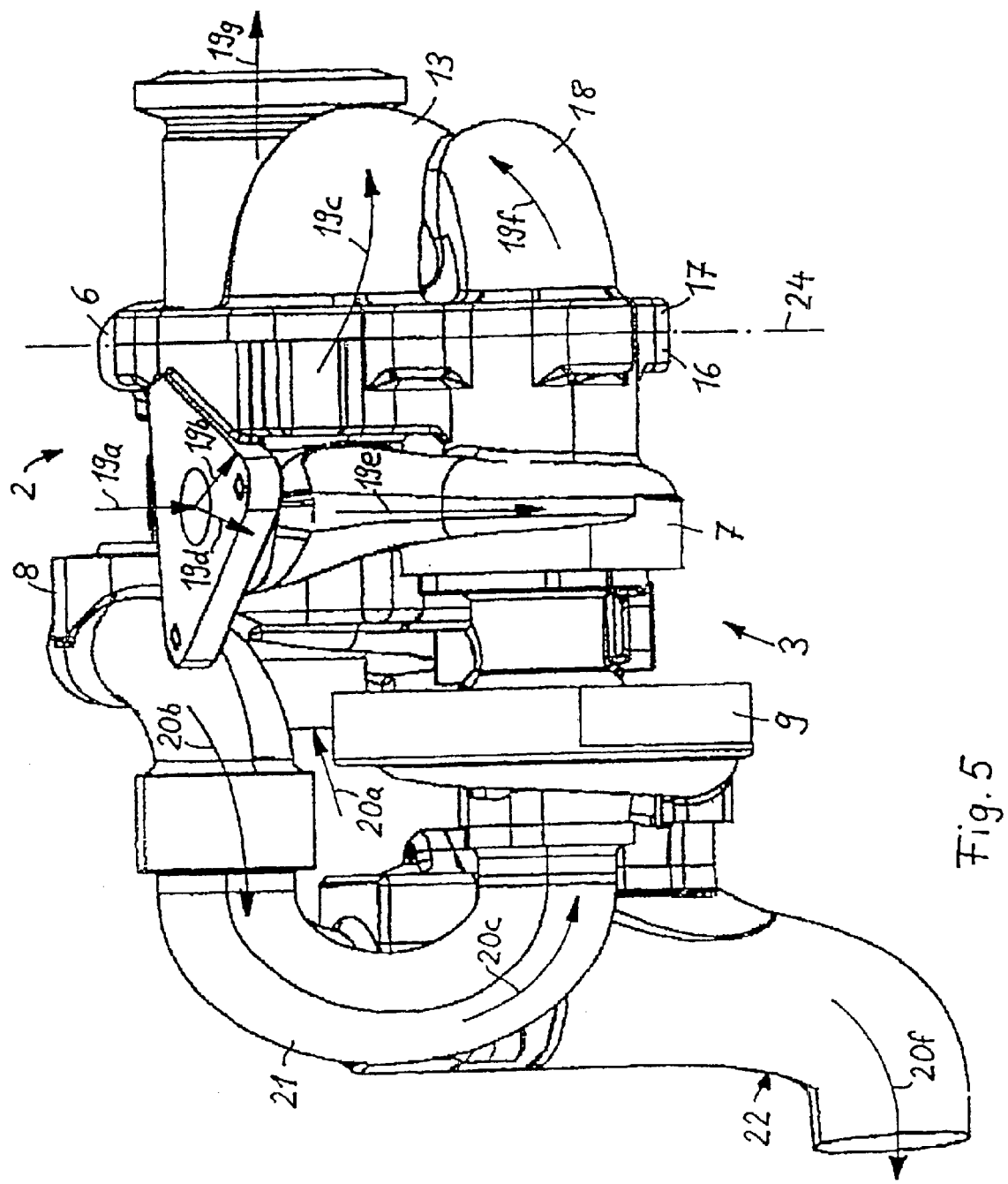
FIG. 5 a first side view.

In the exemplary embodiment shown in FIGS. 1–6, the same reference numbers refer to the same elements.

The turbocharger device 1 for an internal combustion engine shown in FIGS. 1–6 is comprised of two exhaust gas turbochargers 2, 3 of different dimensions, which are coupled to each other via diverse air and exhaust gas-connecting channels. The two exhaust gas turbochargers 2, 3 have parallel axis 4, 5. The two exhaust gas turbochargers 2, 3 respectively include one turbine 6, 7 drivable by the exhaust gas of the internal combustion engine as well as one compressor 8, 9 driven by the associated rotating turbines, which draw in fresh air and compress this to a higher boost pressure.

The turbine 7 of the smaller exhaust gas turbocharger 3, which is characterized by a smaller volumetric throughput and a smaller output capacity, at the same time however exhibits a smaller inertia lag and thereby makes possible already at low engine RPM a significant charge air pressure increase, has at its turbine housing 10 a mounting flange 11 for connecting the turbocharger device 1 with the internal combustion engine. The mounting flange 11 is provided with an inflow opening of an exhaust gas inflow channel 12, wherein the connecting flange 11 is connected to the internal combustion engine in the manner, that the exhaust gas output of the internal combustion engine can communicate with the exhaust gas inflow channel 12. Further, a first exhaust gas channel segment 13 as well as a second exhaust gas channel segment 14 is provided at the turbine housing 10 of the smaller exhaust gas turbocharger 3, whereby both channel segments 13, 14 are connected with the exhaust gas inflow channel 12, which branch off from the mounting flange 11. The first exhaust gas channel segment 13 leads from the inflow channel 12 immediately to the turbine 6 of the larger exhaust gas turbocharger 2, the second exhaust gas channel segment 14 leads immediately from the inflow channel 12 to the turbine 7 of the smaller exhaust gas turbocharger 3. In the area of the branching from the inflow channel 12 to the two channel segments 13, 14 a regulating means 15 is provided, covered over by the mounting flange 11, which is designed to be adjustably controlled and via which the exhaust gas flow through at least one of the channel segments 13, 14 is precisely adjustable. The regulating means is constructed for example as an adjustable valve or throttle valve.

In a useful embodiment, at least the exhaust gas flow through the channel segment 13, which leads to the turbine 6 of the larger exhaust gas turbocharger 2, is adjustable with precision via the regulating means 15.

The turbine housing 10 further includes a valve housing 16, in which the regulating means 15, preferably constructed as an adjusting valve, is received. The valve housing 16 is closed by a removable connecting cover or lid 17, which on the one hand is connected in a flange-like manner with the channel segment 13 for the supply of the exhaust gas to the larger exhaust gas turbocharger 2 and on the other hand is connected with a by-pass channel 18, which connects the output of the smaller turbine 7 with the input of the larger turbine 6.

In the following the flow path of the exhaust gas through the turbocharger device 1 is described. The exhaust gas from the internal combustion engine flows in the direction of the arrow 19a through the inflow opening at the mounting flange 11 into the exhaust gas inflow channel 12. Depending upon the design and the position of the regulating means 15 in the inflow channel 12 the exhaust gas is either directed in the direction of the arrow 19b, 19c through the channel segment 13, via which the exhaust gas is supplied to the large turbine 6, or in the arrow direction 19d, 19e through the channel segment 14, via which the exhaust gas can be supplied to the small turbine 7. In the latter case, the exhaust gas, after flowing through the small turbine 7 in the direction of the arrow 19f, is conveyed through the bypass channel 18 to the large turbine 6.

At lower loads or, as the case may be, lower RPM, the regulating means 15 is preferably adjusted in such a manner that the exhaust gas flows in the direction of the arrow 19a, 19d, 19e, 19f first into the small turbine 7 and subsequently into the sequentially connected large turbine 6. In this exhaust gas flow, the comparatively smaller exhaust gas pressure is sufficient for accelerating the smaller turbine 7; the remaining residual energy of the exhaust gas can be used to cause the turbine 6 of the larger exhaust gas turbocharger 2 to revolve. At higher loads or, as the case may be, higher RPM, the regulating means 15 is preferably adjusted in such manner that the exhaust gas flows in the direction of the arrow 19a, 19b, 19c through the inflow channel 12 and the channel segment 13 with bypassing of the small turbine 7 and flowing immediately to the large turbine 6.

According to a further embodiment, the regulating means can be constructed in such a manner that this, at higher loads, or as the case may be RPM, can assume a position in which the exhaust gas is directed via the channel segment 13 directly to the larger turbine 6 as well as via the channel segment 14 directly to the smaller turbine 7. This embodiment has the advantage that the smaller turbine 7 is permanently maintained in rotation and can contribute a supplemental compressing of the charged air.

After flowing through of the larger turbine 6, the exhaust gas is directed out of this in the direction of arrow 19g and continues to a catalytic converter.

The air supply of the fresh air drawn in and compressed through the compressors 8, 9 of the larger exhaust gas turbocharger 2 or, as the case may be, smaller exhaust gas turbocharger 3 occurs as follows: in the direction of arrow 20a environmental air is directed to the larger compressor 8, from this the pre-compressed air is directed in the direction of arrow 20b, 20c through a first supply channel between the compressor output of larger compressor 8 and the compressor input of the smaller compressor 9 and so is directed to the latter, is compressed by the latter to the charge pressure, and via a further air supply channel 22 with a segment 22a close to the compressor, lying immediately at the compressor output, and a segment 22b distanced from compressor, is directed in the direction of arrow 20d, 20e, 20f to the inlet of the internal combustion engine.

It can be useful to provide a bypass channel 23, via which the first air supply channel 21 and the second air supply channel 22 can be connected, wherein in the bypass channel 23 an adjustable bypass valve for widening and restricting the throughput cross section of the bypass channel is provided. If the bypass channel 23 is opened, then the air compressed in the larger compressor 8 flows immediately out of the compressor 8 via the bypass channel 23 into the latter segment 22b of the second air supply channel 22 and is via this immediately introduced into the internal combustion engine as charged air.

The connecting flange 11 with the exhaust gas inflow channel 12 as well as the regulating means 15 preferably forms a pre-assembled unitary construction component, which is part of the turbine housing 10 or, as the case may be, is to be connected to the turbine housing 10. Besides this, it can be advantageous to construct the valve housing 16 inclusive of the connecting lid 17 and in certain cases the two channel segments 13 and 14 as a single construction component or unit, which particularly preferably forms a common construction component together with the system comprised of mounting flange 11, inflow channel 12, and regulating means 15. As can be seen particularly in FIG. 5, the connecting lid 17 with the channel segment 13 and the bypass channel 18 lies in a plane 24 with the valve housing 16.

Figure 6:
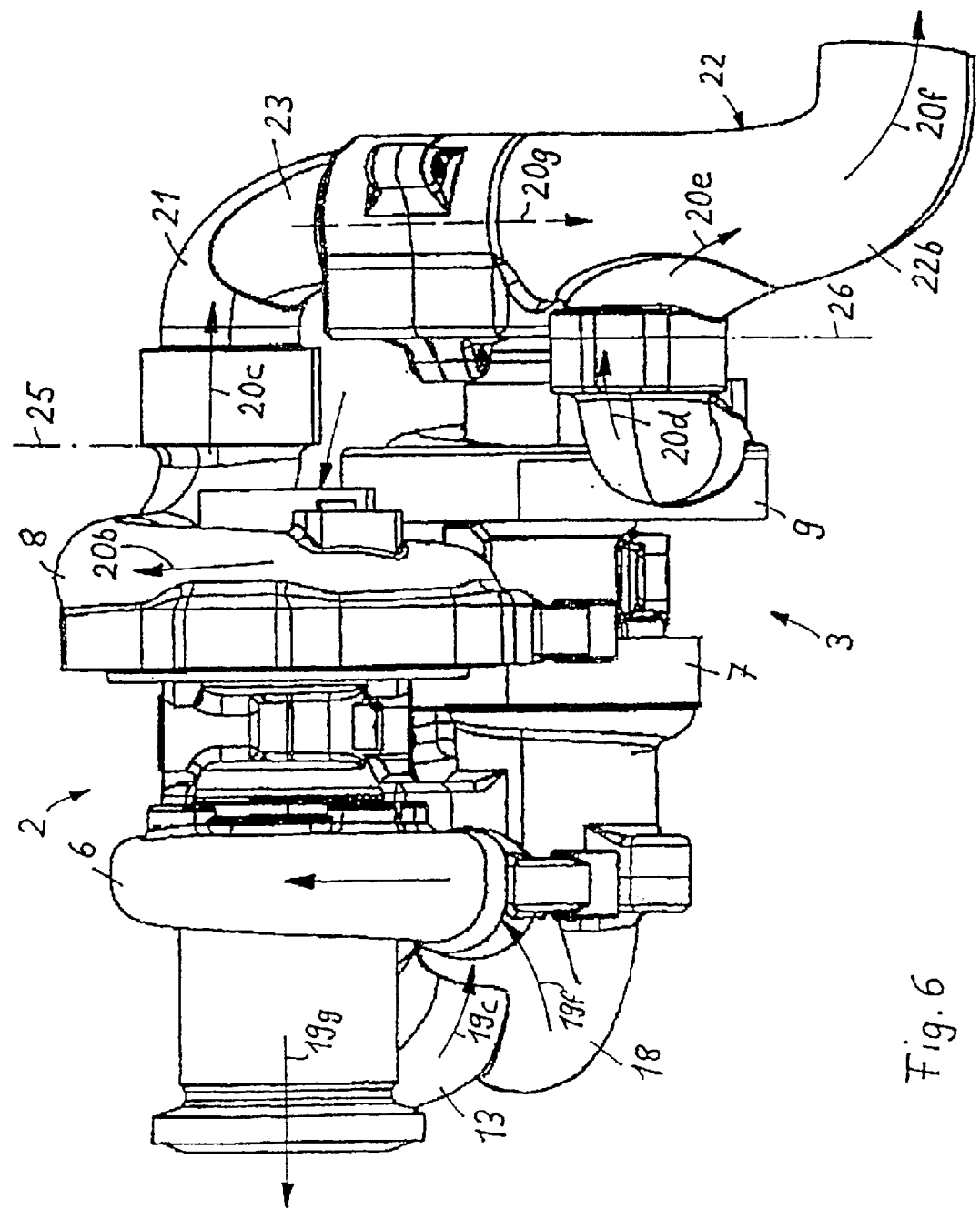
FIG. 6 a second side view.

Beyond this, FIG. 6 shows that the connections of the air supply channels 21 and 22 on the compressors 8 or as the case may be 9 lie in parallel set-off planes 25 and 26.

What is claimed is:

1. A turbocharger device for an internal combustion engine, comprising:

two exhaust gas turbochargers, each having a housing, each having turbines drivable by exhaust gas from the internal combustion engine and having compressors for compressing charge gas for the internal combustion engine to a higher charge pressure, a common exhaust gas inflow channel (12) for both turbines (6, 7) provided on the turbine housing (10) of at least one of the exhaust gas turbochargers (2, 3), wherein two exhaust gas channel segments (13, 14) branch off from the common exhaust gas inflow channel (12) for supplying exhaust gas to each turbine (6, 7), a regulator device provided in the flow path of the exhaust gas for adjusting the supply of exhaust gas to one of the turbines or to both turbines, wherein the regulating device (15) is provided where the channel segments (13, 14) branch from the exhaust gas inflow channel (12) on the turbine housing (10), and wherein the turbine housing (10) includes a connecting flange (11) for connecting to an exhaust gas outlet of the internal combustion engine, wherein the exhaust gas inflow channel (12) is provided in the area of the connecting flange (11).

2. A turbocharger device according to claim 1, wherein the two exhaust gas turbochargers (2, 3) exhibit parallel axes (4, 5).

3. A turbocharger device according to claim 1, wherein a by-pass channel (23) with by-pass valve is provided between (a) a first air supply channel (21) between the compressor output of the first turbocharger compressor (8) and the compressor input of the second turbocharger compressor (9) and (b) a second air supply channel (22) at the compressor output of the second compressor (9).

4. A turbocharger device according to claim 1, further comprising two air supply channels (21, 22), wherein one of said air supply channels (21) extends between the compressor output of the first turbocharger compressor (8) and the compressor input of the second turbocharger compressor (9), wherein the other of said air supply channels (22) is the compressor output of the second turbocharger compressor (9), and wherein said two air supply channels form a replaceable module.

5. A turbocharger device according to claim 1, wherein the compressor output of the first turbocharger compressor (8) and the compressor input of the second turbocharger compressor (9) lie on parallel planes (24, 25, 26).

6. A turbocharger device according to claim 1, further comprising two air supply channels (21, 22), wherein one of said air supply channels (21) extends between the compressor output of the first turbocharger compressor (8) and the compressor input of the second turbocharger compressor (9), wherein the other of said air supply channels (22) is the compressor output of the second turbocharger compressor (9), and wherein a connecting channel is provided between the two air supply channels (21, 22).

7. A turbocharger device for an internal combustion engine, comprising:

first and second exhaust gas turbochargers, each having a housing, each having turbines drivable by exhaust gas from the internal combustion engine and each having compressors for compressing charge gas for the internal combustion engine to a higher charge pressure, a common exhaust gas inflow channel (12) for both turbines (6, 7) provided on the turbine housing (10) of at least one of the exhaust gas turbochargers (2, 3), wherein two exhaust gas channel segments (13, 14) branch off from the common exhaust gas inflow channel (12) for supplying exhaust gas to each turbine (6, 7), a regulator device provided in the flow path of the exhaust gas for adjusting the supply of exhaust gas to one of the turbines or to both turbines, wherein the regulating device (15) is provided where the channel segments (13, 14) branch from the exhaust gas inflow channel (12) on the turbine housing (10), wherein the two exhaust gas turbochargers (2, 3) are different in size, wherein the regulating means (15) is adjustable in such a manner, that during one of (a) low loads and (b) low rate of rotation the channel segment (13) associated with the larger exhaust gas turbocharger (2) is blocked, and during one of (a) high loads or (b) high rate of rotation the channel segment (13) associated with the larger exhaust gas turbocharger (2) is open, and wherein the exhaust inflow channel (12), the two exhaust gas channel segments (13, 14), and the regulating means (15) are integrated in the turbine housing (10) of the smaller exhaust gas turbocharger (3).

8. A turbocharger device according to claim 7, wherein the two exhaust gas turbochargers (2, 3) exhibit parallel axes (4, 5).

9. A turbocharger device according to claim 7, wherein a by-pass channel (23) with by-pass valve is provided between (a) a first air supply channel (21) between the compressor output of the first turbocharger compressor (8) and the compressor input of the second turbocharger compressor (9) and (b) a second air supply channel (22) at the compressor output of the second turbocharger compressor (9).

10. A turbocharger device according to claim 7, further comprising two air supply channels (21, 22), wherein one of said air supply channels (21) extends between the compressor output of the first turbocharger compressor (8) and the compressor input of the second turbocharger compressor (9), wherein the other of said air supply channels (22) is the compressor output of the second turbocharger compressor (9), and wherein said two air supply channels form a replaceable module.

11. A turbocharger device according to claim 7, wherein the compressor output of the first turbocharger compressor (8) and the compressor input of the second turbocharger compressor (9) lie on parallel planes (24, 25, 26).

12. A turbocharger device according to claim 7, further comprising two air supply channels (21, 22), wherein one of said air supply channels (21) extends between the compressor output of the first turbocharger compressor (8) and the compressor input of the second turbocharger compressor (9), wherein the other of said air supply channels (22) is the compressor output of the second turbocharger compressor (9), and wherein a connecting channel is provided between the two air supply channels (21, 22).

* * * * *